United States Patent [19]
Michael

[11] 3,965,880
[45] June 29, 1976

[54] AUTOMOTIVE REAR MAIN BEARINGS

[76] Inventor: Ronnie L. Michael, 1040 W. Enid, Mesa, Ariz. 85202

[22] Filed: Feb. 18, 1975

[21] Appl. No.: 550,814

[52] U.S. Cl. ............... 123/196 R; 123/196 CP; 184/6.5; 308/167
[51] Int. Cl.² ........................... F01M 1/00
[58] Field of Search ............ 123/196 R, 196 CP; 184/1.5, 6.5, 6.4; 308/23, 78, 98, 115, 167, 179; 277/134

[56] References Cited
UNITED STATES PATENTS

| | | | |
|---|---|---|---|
| 1,182,392 | 5/1916 | Lundberg | 277/134 |
| 1,355,706 | 10/1920 | Snyder | 308/167 |
| 1,421,518 | 7/1922 | Marris | 308/167 |
| 2,044,269 | 6/1936 | Williams | 184/6 J |
| 2,328,296 | 8/1943 | Ritter | 184/6 J |
| 2,544,913 | 3/1951 | Brantingham | 184/6 J |
| 3,622,212 | 11/1971 | Laumont | 308/78 |

*Primary Examiner*—Wendell E. Burns
*Assistant Examiner*—David D. Reynolds
*Attorney, Agent, or Firm*—Cahill, Sutton & Thomas

[57] ABSTRACT

In an automotive internal combustion engine, a rear main bearing is channeled with one or more channels to direct the high pressure output oil flow away from the rear main seal. The channeled oil flow prevents a high pressure buildup adjacent the rear main seal and attendant deterioration thereof and oil leakage therethrough.

9 Claims, 4 Drawing Figures

AUTOMOTIVE REAR MAIN BEARINGS

The present invention relates to bearings and, more particularly, to bearings for internal combustion engine crank shafts.

Internal combustion engines, whether two or four cycle, include one or more reciprocating pistons attached to a crank shaft through connecting rods. The crank shaft, in combination with the connecting rods, translates the reciprocal motion of the piston into a rotary power output. The rotary movement of the crank shaft is transmitted directly or through gear means to drive an element, such as the rear wheels of an automobile. The crank shaft is supported by at least a front and a rear main bearing and one or more intermediate main bearings, depending upon the length of the crank shaft, the power output and other factors. Each of these main bearings must be of relatively close tolerance and well lubricated to withstand the applied forces and minimize friction and wear.

The crank shaft extends through an aperture within the engine wall in proximity to the rear main bearing for attachment to a fly wheel or the like. A rear main seal is disposed intermediate the engine wall and the protruding crank shaft to prevent oil seepage therebetween.

In conventional internal combustion engines, an annular space exists intermediate the rear main seal and the rear edge of the rear main bearing. This space, in combination with a return passageway to the oil sump, provides a means for collecting the oil outflow rearwardly from the rear main bearing and returning it to the oil sump. With the almost exclusive present use of full pressure lubricating systems in automobile engines and the high ambient oil pressures, the annular space and associated passageway adjacent the rear main seal is generally inadequate in preventing a high pressure buildup in proximity to the rear main seal. The high pressure buildup in combination with the force of the oil outflowing from the rear main bearing tend to deteriorate and deform the rear main seal, resulting in oil leakage therethrough.

It is therefore a primary object of the present invention to provide a means for preventing oil leakage through the rear main seal of any internal combustion engine.

Another object of the present invention is to prevent an oil pressure buildup adjacent the rear main seal of automotive internal combustion engines.

Still another object of the present invention is to provide a rear main bearing for internal combustion engines which directs the outflowing oil away from the rear main seal.

Yet another object of the present invention is to provide a replacement rear main bearing which prevents oil leakage through the rear main seal due to deterioration by impinging oil under high pressure.

A further object of the present invention is to provide a means for modifying any existing rear main bearings to prevent deterioration or rupture of the rear main seal.

A still further object of the present invention is to provide a means for modifying the rear main bearings of any internal combustion engine to prevent oil leakage through the rear main seal.

These and other objects of the present invention will become apparent to those skilled in the art as the description thereof proceeds.

The present invention will be described with greater specificity and clarity with respect to the following figures, in which.

Figure 1:
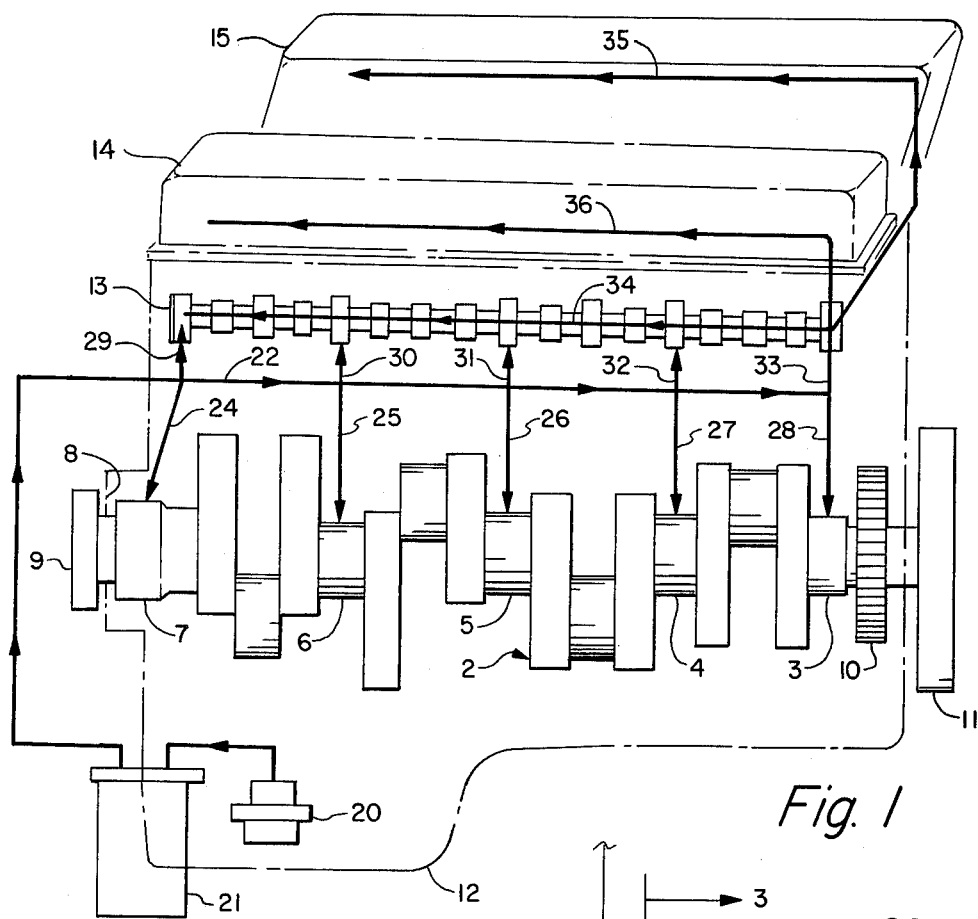
FIG. 1 is a schematic illustration of a representative oil distribution system within an automotive internal combustion engine.

FIG. 1 is a schematic representation of a full pressure lubrication system disposed within an automotive internal combustion engine 1. A crank shaft 2 is mounted within the block of the engine by means of front main bearing 3, main bearings 4, 5 and 6 and rear main bearing 7. The crank shaft extends rearwardly of engine 1 through a rear main seal 8 and terminates at a radial flange 9. The front of the crank shaft may include a timing gear 10 and may extend forwardly of the engine to support one or more pulleys 11. The open bottom part of the block is covered by a downwardly extending pan 12, which pan also serves as an oil sump. A chain or gear driven cam shaft 13 is disposed within the block above the crank shaft. The cam shaft supports a plurality of push rods, which push rods act through a rocker assembly to open and close the valves. The rocker assembly or assemblies are housed within one or more valve covers 14 and 15.

An oil pump 20, normally housed within pan 12, has an oil pickup disposed within the oil sump. The oil pump pumps the oil through a filter 21 into main oil gallery 23. The main oil gallery feeds oil to each of the main bearings through oil lines 24, 25, 26, 27, and 28. A plurality of passageways are generally disposed within crank shaft 2 to distribute oil from the main bearings to the bearings intermediate the crank shaft and the connecting rods. Additional oil lines 29, 30, 31, 32 supply oil to the cam shaft bearings. A passageway 33 distributes oil to the valve lifter oil gallery 34 and rocker arm oil galleries 35 and 36. Oil return to the oil sump is effected by drainage through various passageways.

Automotive internal combustion engines of a few years ago were designed to operate at low rpm with high torque at low rotational speed. For those engines which used full pressure lubrication systems, the oil pump pressure was generally in the vicinity of twenty pounds per square inch and ranged up to thirty pounds per square inch in rare instances. Recent modifications of engine design criteria have caused the engines to operate at substantially increased rpm and high tolerances. In order to obtain adequate lubrication under these operating parameters, the oil pressure has been increased to the vicinity of forty pounds per square inch. The increase in oil pressure, while necessary to adequately lubricate the engine, has created problems in obtaining adequate and long lasting oil seals. One such troublesome seal has been the rear main seal 8.

Figure 2:
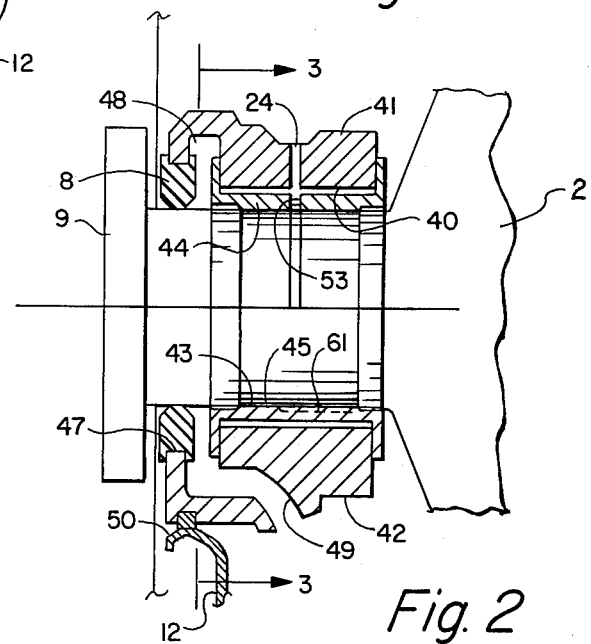
FIG. 2 is a cross-sectional view of a rear main bearing constructed in accordance with the teachings of the present invention and a conventional rear main seal.

Referring now to FIG. 2, the operation and elements affecting the sealing capability of the rear main seal will be described. The underlying support for the rear main bearing of crank shaft 2 is provided by a cylindrical depression 40 disposed within the corresponding part of block 41 of engine 1. A bearing cap 42, having a mating semi-cylindrical depression 43 is bolted to block 41, to retain the crank shaft and rear main bearing therebetween. A pair of mating radially flanged semi-cylindrical bearings 44 and 45 are seated within depressions 40 and 43, respectively, with the radial flanges preventing axial or longitudinal displacement of the bearings.

The rear main seal 8 is retained within a mating circular aperture 47 disposed within the rear wall of engine 1 to encircle the protruding part of crank shaft 2. As mentioned above, the purpose of the rear main seal is that of preventing oil flow adjacent the surface of the protruding part of the crank shaft.

An annular cavity 48 is disposed about crank shaft 2 intermediate the rear radial flanges of bearings 45 and 46 and the rear main seal 8. A passageway 49 interconnects the annular cavity with the oil sump to permit oil drainage into the sump from the annular cavity. Pan 12 is bolted or otherwise secured to the lower surface of block 41 with an intermediate seal 50.

Normally, lubrication for the rear main bearing is provided by oil flow through oil line 24 within block 41, which oil line terminates coincident with an aperture 53 extending through bearing 44. A slot 54 is disposed within the inner surface 55 of bearing 44 to distribute the oil inflowing through slot 53 intermediate the bearing and the bearing surface of crank shaft 2. By well known hydraulic principles, the oil disposed within slot 54 will be distributed intermediate the inner surfaces of both bearings 44 and 45 and the corresponding bearing surfaces of crank shaft 2. The normal oil outflow from bearings 44 and 45 will be forwardly and rearwardly along the crank shaft. The oil flowing forwardly will ultimately drip into the oil sump. The oil flowing rearwardly, will tend to strike rear main seal 8 and collect within annular cavity 48 with drainage therefrom occurring through passageway 49.

Figure 3:
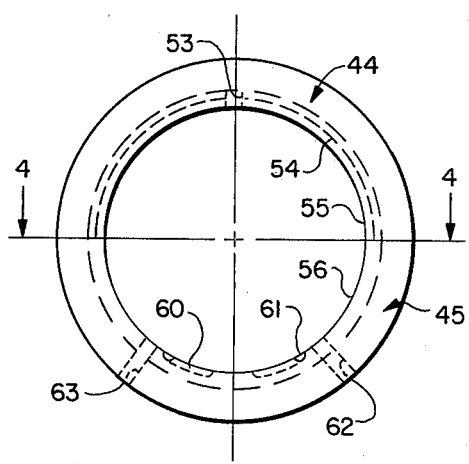
FIG. 3 is an end view of a rear main bearing adapted to incorporate the teachings of the present invention and taken along lines 3—3, as shown in FIG. 2.
Figure 4:
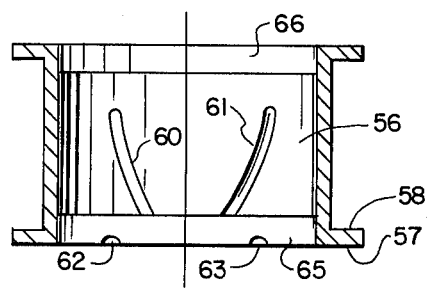
FIG. 4 is a top view of a rear main bearing adapted to incorporate the present invention taken along lines 4—4, as shown in FIG. 3.

The present invention and its capability for preventing deterioration of leakage through the rear main seal will be described with joint reference to FIGS. 2, 3 and 4. In earlier engines having oil pressures in the range of twenty pounds per square inch, the force of the oil outflowing rearwardly from the rear main bearing had a low velocity and was low in volume. However, when the oil pressure was increased to forty pounds per square inch without redesigning the lubrication system in proximity to the rear main bearing, the outflowing oil acquired sufficient force to damage and cause deterioration of rear main seal 8. Moreover, the increased volumetric flow exceeded the oil collection and discharge capability of the annular cavity 48. Hence, a high pressure environment was created within the annular cavity and placed a strain upon the rear main seal.

The present invention teaches a means for overcoming the debilitating effects of the rearwardly flowing high pressure oil discharge and the ambient high pressure oil environment adjacent the rear main seal. By forming one or more forwardly extending shallow depressions or channels 60 and 61 in inner surface 56 of lower bearing 45, passageways are established to induce forward flow of oil from the bearing. The forward flow of the oil relieves the pressure buildup within annular cavity 48 and reduces both the volume and velocity of the rearwardly flowing oil. In engines where the forward surface 57 of flange 58 abuts a planar surface of crank shaft 2, a relief must be provided to permit oil flow therebetween. Such a relief is accommodated by means of a pair of radially extending depressions 62 and 63.

From the above description, it will become apparent that presently manufactured and used bearings can be readily modified by adapting them to include channels 60 and 61, and where necessary, depressions 62 and 63. When such modifications are made therein, the destructive effects of both high velocity oil striking rear main seal 8 and high oil volume flow into annular cavity 48 are obviated.

It may also be pointed out that by limiting the length of channels 60 and 61, such that they extend inwardly (longitudinally) from the forward edge of the bearing surface to a point short of the rear edge of the bearing surface, no reduction in lubrication or the quality thereof has been experienced. The number of channels and their orientation may, of course, vary depending upon the ambient oil pressure, the viscosity of the oil and the bearing tolerances. However, it has been learned that for most popular cars manufactured in America, two channels disposed in opposite sides of the lower bearing and extending across approximately four-fifths of the bearing surface and angled toward the low point of the bearing surface has produced very satisfactory results. Moreover, the width of the channels may be on the order of ⅛ of an inch and their depth may range from one thousands to ten thousands of an inch. The exact and preferred dimensions will vary with the type and nature of the bearing in conjunction with the nature of the existing lubrication system.

It may be noted that the annular depressions 65 and 66 are a function of the bearing design and do not form a part of the bearing surfaces (54, 56).

After an engine 1 without modified rear main bearings has been shut off, there may exist a pressure buildup within the oil distribution system for varying periods of time, dependent to a great extent upon the amount of sludge in the oil, constrictions within return passages and the tolerance between the parts wherethrough the oil must flow. At the rear main bearing, it is not unusual to have a substantial pressure buildup intermediate the bearing and the corresponding bearing surface of the crank shaft and within the annular cavity for a substantial period after the oil pump has ceased to operate. The slowly decaying pressure environment tends to cause oil seepage intermediate the rear main seal and the crank shaft. In many cases, this pressure environment is responsible for the oil drips which occur after a car is parked.

If channels 60 and 61 are employed in accordance with the teachings of the present invention, there will occur an almost immediate complete pressure relief within the rear main bearing after the engine is shut off. Hence, there is only a short period lingering pressure environment within the rear main bearing and the adjacent annular cavity. Moreover, as the maximum pressure during operation of the engine is within acceptable limits, the brief lingering pressure is tolerable and there will exist little cause for oil seepage intermediate the rear seal and the crank shaft. Thus, the present invention tends to obviate one of the primary causes for dripping oil after the engine has shut off.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. In an automotive internal combustion engine having a crank shaft mounted within the engine block and including at least a rear main bearing and a rear main seal, the improvement comprising in combination:
   a. a two part rear main bearing for providing a bearing surface intermediate the engine block and the crank shaft, said bearing including an upper half and a lower half; and
   b. at least one channel disposed within said lower half bearing for conveying a flow of oil, said channel extending rearwardly from the front longitudinal edge of the bearing surface to a point short of the rear longitudinal edge of the bearing surface; whereby, the oil outflow intermediate the crank shaft and said rear main bearing surface is directed toward the front longitudinal edge of the bearing surface and away from the rear main seal.

2. The improvement as set forth in claim 1 including a further channel disposed within said lower half bearing.

3. The improvement as set forth in claim 2 wherein said channel and said further channel are disposed within opposed halves of said lower half bearing.

4. The improvement as set forth in claim 3 wherein said channel and said further channel are oriented in a converging relationship.

5. The improvement as set forth in claim 4 further including at least one radial depression disposed in the front longitudinal edge of said lower half bearing, said depression being in fluid communication with at least one of said channel and said further channel.

6. The improvement as set forth in claim 5 further including a further radial depression disposed in the front longitudinal edge of said lower half bearing, said depression being in fluid communication with said channel and said further depression being in general coincidence with said further channel.

7. A bearing for supporting a rotating shaft and including means for introducing a flow of oil from an oil pressure source to the bearing surface of said bearing, said bearing comprising in combination:
   a. a semi-cylindrical upper half bearing;
   b. a semi-cylindrical lower half bearing mating with said upper half bearing to define a bearing surface about the shaft;
   c. at least one channel disposed within the inner bearing surface of said lower half bearing for conveying an outflow of oil from said bearing, said channel extending from the front longitudinal edge of the bearing surface to a point short of the rear longitudinal edge of the bearing surface; whereby, said channel directs the outflow of oil from said bearing toward the front longitudinal edge.

8. A bearing for supporting a rotating shaft and including means for introducing a flow of oil from an oil pressure source to the bearing surface of said bearing, said bearing comprising in combination:
   a. a semi-cylindrical upper half bearing;
   b. a semi-cylindrical lower half bearing mating with said upper half bearing to define a bearing surface about the shaft;
   c. a pair of channels, each of said channels being disposed in opposed halves of said lower half bearing for conveying an outflow of oil from said bearing, each said channel extending from the front longitudinal edge of the bearing surface to a point short of the rear longitudinal edge of the bearing surface; whereby, said pair of channels direct the outflow of oil from said bearing toward the front longitudinal edge.

9. The bearing as set forth in claim 8 including at least one depression disposed within the front longitudinal edge of said lower half bearing in general proximity to the corresponding ends of said pair of channels.

* * * * *